Patented May 1, 1951

2,551,046

UNITED STATES PATENT OFFICE 2,551,046

PROCESS FOR THE PRODUCTION OF ACETARYLAMIDES

Edgar Stagg Pemberton, Banstead, England, assignor to British Industrial Solvents Limited, London, England, a British company No Drawing. Application January 14, 1949, Serial No. 71,029. In Great Britain September 20, 1945

6 Claims. (Cl. 260—562)

This invention is for an improvement in or relating to the production of acetarylamides and is a continuation-in-part of my copending application Serial No. 696,041 filed on 10th September 1946, now Patent No. 2,462,221.

Numerous methods have, in the past, been employed for the preparation of acetanilide but the method which has heretofore been used on the large scale generally consists in heating a mixture of aniline and acetic acid (the latter being in considerable excess, for instance 50-60% excess over the stoichiometric amount) and slowly distilling off dilute acetic acid. The water in the distillate derives from the dehydration of the aniline acetate to acetanilide, and the concentrations of the acetic acid in the initial and final distillates vary between 20% and 70% by volume. Yields are said to be of the order of 96–98% of the theoretical based on the aniline in the charge.

It has also been proposed to manufacture acetanilide and para-acet-toluidide by heating the corresponding amines with acetic anhydride, the anhydride being present in less than equimolar proportions. The dilute acetic acid resulting from the reaction is distilled off, whereupon a further quantity of acetic anhydride is added to the reaction mixture and the process repeated until the acetylation is complete. This process obviously has the disadvantage, besides requiring the use of acetic anhydride which is an expensive substance, that the distillation of dilute acid formed during the reaction and the subsequent additions of fresh acetic anhydride with avoidance of overheating due to the exothermic reaction leads to as many interruptions of the manufacturing procedure.

According to the present invention there is provided a process for the production of acetarylamides comprising heating an aryl amine with an excess of acetic acid not exceeding 25% by weight of the amount theoretically required, in the presence of a chlorinated aliphatic hydrocarbon in an amount not exceeding about 5% by weight of the reaction mixture, effecting the reaction at temperatures between 130° and about 200° C. whilst distilling off from the reaction mixture the water of reaction in the form of a binary mixture with said chlorinated aliphatic hydrocarbon condensing the distillate, separating the chlorinated aliphatic hydrocarbon therefrom, returning the separated chlorinated aliphatic hydrocarbon to the reaction mixture and finally distilling off the chlorinated aliphatic hydrocarbon by distillation under substantially atmospheric pressure and distilling off an excess of unreacted acetic acid under sub-atmospheric pressure.

As chlorinated aliphatic hydrocarbons may be used e. g. chloroform, carbon tetrachloride, propylene dichloride, dichlorethylene, butylchloride. By the process of this invention it is possible to carry out the acetylation of aniline more rapidly and with a much smaller quantity of acetic acid than has hitherto been employed. A further advantage is that at least 75% by weight of the excess acid can be recovered in the form of anhydrous acetic acid for re-use. This means that about 95% by weight of the acetic acid charged into the reactor is recovered either in the form of acetanilide or as anhydrous acetic acid.

The quantity of chlorinated aliphatic hydrocarbon that is required to carry out the process of my invention is dependent on the capacity of the fractionating column, but is relatively small and may, for example, be as low as 2-3% by weight of the total reaction mixture.

The production of acetanilide, for example, may be carried out by charging into the reaction vessel (preferably fitted with an efficient fractionating column) a mixture of the whole of the aniline, chlorinated aliphatic hydrocarbon and acetic acid required for the process and heating the mixture until evaporation of the chlorinated hydrocarbon-water binary mixture begins. I prefer to add the whole of the acetic acid at the commencement of the operation rather than to add the acid gradually throughout the reaction as the latter process involves a considerable lengthening of the time required to bring the reaction to completion.

As the reaction proceeds the chlorinated hydrocarbon-water vapour distilling off through the fractionating column is condensed and is allowed to separate into two layers, the one layer of chlorinated hydrocarbon being returned to the reaction vessel or column. When no more water distils off the residual chlorinated hydrocarbon is finally distilled off and excess acetic acid recovered from the reaction vessel by distillation under sub-atmospheric pressure. Any tendency to decomposition of the product is thereby avoided.

Catalysts may be employed in the reaction if desired, but I have found that the reaction proceeds satisfactorily in their absence.

The reaction may be carried out at a temperature between 130 and about 200° C. As the reaction proceeds towards completion it might be necessary to raise the temperature within these limits.

After removal of the water is completed the excess of chlorinated hydrocarbon is recovered by distillation at substantially atmospheric pressure. In this way the loss of the chlorinated hydrocarbon is cut down to a minimum. As previously stated the acetic acid distillation is conducted under reduced pressure, for instance at a pressure of 110–130 mm. of mercury. At this pressure the boiling point of the acetanilide is about 30° C. above that employed for stripping off the chlorinated hydrocarbon at atmospheric pressure so that a heating system suitable for acetylation and chlorinated hydrocarbon stripping would suffice for the stripping of the acetic acid. Thus a grade of acetanilide suitable for sale can be made in one vessel with a minimum amount of handling.

The product obtained in the above manner is suitable for most industrial purposes. The molten anilide may be run off on to a flaking device. It is characterised by an acidity below 0.1% by weight (reckoned as acetic acid). By the process of my invention it is easily possible to obtain a product which is completely neutral in reaction. Any further purification required may be effected, for example, by vacuum distillation.

The following examples illustrate the manner in which the invention may be carried into effect:

Example 1

Into a flask fitted with a 13-section Young and Thomas Evaporation Column was charged 7 moles of aniline together with acetic acid (21% by weight in excess of that theoretically required) and carbon tetrachloride equal to 6% of the weight of the total aniline-acetic acid mixture. The liquid reaction temperature was varied between 150° and 165° C. during the distillation of the carbon tetrachloride-water mixture whilst the acetic acid recovery took place up to a liquid temperature of about 240° C. under 110–130 mm. pressure. The reaction was completed in 21 hours and a product having an acidity of 0.08% (as acetic acid) was obtained in 99.6% yield based on the aniline. The anilide has a melting point of 113.5° C. In this example all the acetic acid was fed into the refluxing carbon tetrachloride-aniline mixture.

Example 2

In a further experiment conducted with 21% by weight excess of the theoretically required amount of acetic acid and only 4% by weight of carbon tetrachloride (reckoned as in Example 1), the reaction was conducted at a temperature of 130° to 185° C., whilst the stripping of the acetic acid took place up to a liquid temperature of about 228° C. at 100 mm. pressure. The product which was obtained in 99.7% yield based on the aniline, was neutral in reaction and melted at 113.5° C. In this experiment 70% by weight of the acetic acid was fed in initially the remainder being fed in as the reaction proceeded. The reaction was completed in about 8 hours.

Example 3

428 parts of weight of ortho-toluidine were mixed with 288 parts by weight of glacial acetic acid (being an excess of 20% over the theoretical amount) and 29 parts by weight of propylene dichloride (4% by weight reckoned as in Example 1) and kept for 9.5 hours at a temperature of about 135° C., gradually raising it to 232° C. whilst the isopropyl acetate-water mixture is distilled off and acetic acid recovered as described in the preceding examples. The yield of ortho-acet-toluidide based on ortho-toluidine is 99.5%; on the acetic acid about 96%. The melting point of the product obtained is between 103 and 107° C.

Example 4

428 parts by weight of meta-toluidine were mixed with 243 parts by weight of acetic acid (an excess of 18% of the amount theoretically required) and 44 parts by weight of propylene dichloride (about 5% by weight reckoned as in Example 1), the temperature range was from 125° to 210° C. The reaction was completed in 7.5 hours. The yield based on toluidine was 99.5%, based on acetic acid it was 96.5%. The product melted at 63–64° C.

I claim:

1. A process for the production of acetarylamides which comprises heating an arylamine with an excess of acetic acid not exceeding 25% by weight of the amount theoretically required in the presence of an amount of a lower chloro alkane not exceeding about 5% by weight of the reaction mixture, effecting the reaction at temperatures between 130° C. and about 200° C. whilst distilling off from the reaction mixture the water of reaction in the form of a binary mixture with said lower chloro alkane, condensing the distillate, separating the lower chloro alkane therefrom, returning the separated lower chloro alkane to the reaction mixture and finally distilling off the lower chloro alkane by distillation under substantially atmospheric pressure and distilling off excess of unreacted acetic acid under sub-atmospheric pressure.

2. A process according to claim 1 wherein the lower chloro alkane is carbontetrachloride.

3. A process according to claim 1 wherein the lower chloro alkane is propylene dichloride.

4. A process according to claim 1 in which the arylamine is aniline and the lower chloro alkane is carbontetrachloride.

5. A process according to claim 1 in which the arylamine is ortho-toluidine and the lower chloro alkane is propylene dichloride.

6. A process in accordance with claim 1 in which the arylamine is meta-toluidine and the lower chloro alkane is propylene dichloride.

EDGAR STAGG PEMBERTON.

REFERENCES CITED

The following references are of record in the file of this patent:

UNITED STATES PATENTS

| Number | Name | Date |
| --- | --- | --- |
| 2,462,221 | Pemberton | Feb. 22, 1949 |